United States Patent Office 3,539,747
Patented Nov. 10, 1970

3,539,747
DAMPED BELLOWS CONSTRUCTION
Alfred Alexander Robinson, Stafford, England, assignor to The English Company Limited, London, England, a British company
Filed Mar. 27, 1968, Ser. No. 716,532
Claims priority, application Great Britain, Apr. 13, 1967, 16,992/67
Int. Cl. H01h 33/66
U.S. Cl. 200—144    11 Claims

ABSTRACT OF THE DISCLOSURE

A reservoir for a hysteresis liquid, which comprises an absorbent resilient material, is held in contact with part of a bellows by which the movable contact of a vacuum circuit interrupter is sealed to the evacuated casing. When the reservoir has been loaded with hysteresis liquid (e.g. by injection through a hole in the bearing which slidably supports the movable contact) hysteresis liquid creeps up the internal surface of the bellows so that a film of the hysteresis liquid is formed on the surface of the bellows wall. The presence of such a film of hysteresis liquid substantially reduces the mechanical vibrations induced in the bellows during operation of the vacuum circuit interrupter.

---

This invention relates to bellows or the like and more particularly to vacuum circuit interrupters incorporating such bellows or the like.

The operational life of a vacuum circuit interrupter is likely to be determined by contact erosion when the vacuum circuit interrupter is used in applications which involve relatively infrequent fault break operations each handling a relatively heavy current. With air on one side and a vacuum on the other side of the bellows, through which the movable contact actuating rod of a vacuum circuit interrupter passes, there is very little mechanical damping present so that vibrations at the natural frequency of the bellows, which are induced in the bellows by movement of the actuating rod, last for many cycles following operation of the vacuum circuit interrupter. Therefore, for applications of vacuum circuit interrupters where a large number (of the order of $10^6$) of load break operations may be required, and where each load break operation is likely to handle a current which is less severe than the relatively heavy currents referred to above (for example, where the vacuum circuit interrupter is used in a contactor), the operational life of the vacuum circuit interrupter is likely to be determined by fatigue fracture of the bellows rather than by contact erosion, unless short travel and slow operating speeds, at which such vibrations are not induced, are acceptable.

According to this invention bellows means includes a reservoir for a hysteresis liquid, part of a surface of a bellows wall of the bellows means being associated with the reservoir so that a film of said hysteresis liquid is formed or maintained on said surface when the surface part is in contact with hystersis liquid in the reservoir.

Preferably the bellows means is a bellows of a vacuum circuit interrupter.

By the present invention the operational life of a bellows or the like is extended and consequently the influence of bellows fatigue on the operational life of a vacuum circuit interrupter is reduced.

Figure 1:
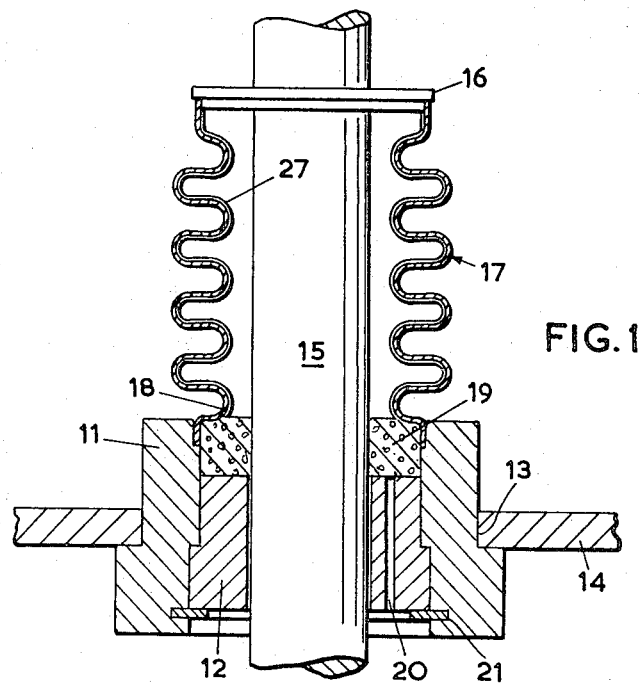
Figure 2:
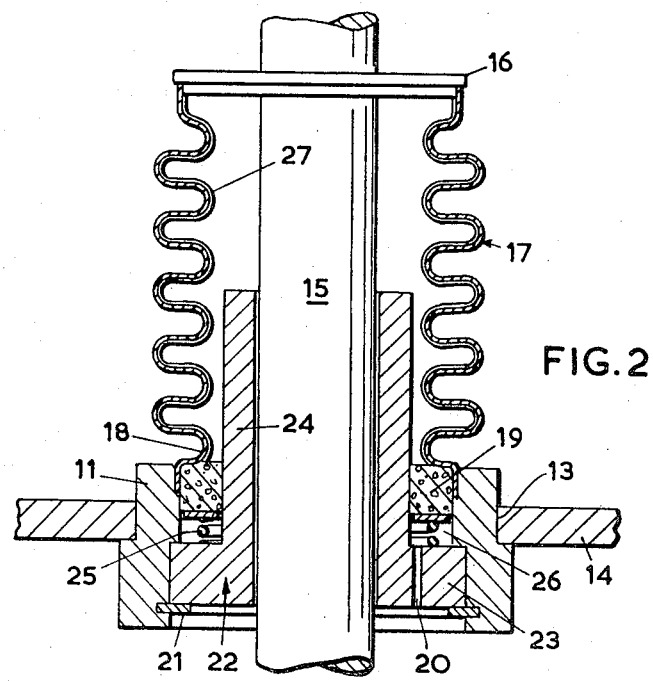

Two embodiments of this invention will now be described by way of example with reference to the accompanying drawings, of which:

FIG. 1 is a sectional view of a part of a vacuum circuit interrupter embodying a bellows and means for damping vibrations in the bellows in accordance with this invention, and FIG. 2 is a sectional view of part of a modified vacuum circuit interrupter embodying a bellows and alternative means for damping vibrations in the bellows in accordance with this invention.

Referring to FIG. 1, an annular bush 11, which surrounds and carries a sleeve bearing 12, is mounted within a circular hole 13 formed in an end plate 14 which forms a wall of the evacuated casing of the vacuum circuit interrupter. The annular bush 11 extends axially beyond each end of the sleeve bearing 12.

An actuating rod 15 passes through and is slidable within the sleeve bearing 12. The actuating rod 15 carries an annular flange 16 on the evacuated side of the end plate 14. A flexible metal bellows 17 is connected between the annular bush 11 and the annular flange 16 with the end convolution 18 of its expandable or contractable bellows wall extending initially radially inwards from the annular bush 11. The end convolution 18 is connected to the annular bush 11. The annular bush 11, the flexible bellows 17, the annular flange 16 and the actuating rod 15 together form part of the boundary of the evacuated enclosure which is constructed to withstand a high vacuum. A pair of relatively movable contacts, one of which is carried by the actuating rod 15, is contained within the evacuated enclosure.

A ring 19 of absorbent resilient material lies within the annular bush 11 and around the actuating rod 15 so as to be in contact with and to be trapped between the end of the sleeve bearing 12 adjacent the bellows 17 and the end convolutions 18. A hole 20 extends axially through the sleeve bearing 12. A circlip 21, which is spigotted radially into the inner wall of the annular bush 11 adjacent the end of the sleeve bearing 12 remote from the ring 19, retains the sleeve bearing 12 in position within the annular bush 11.

Referring to FIG. 2, in many respects the vacuum circuit interrupter of which part is shown, is similar to that of which part is shown in FIG. 1 and similar parts are identified by the same reference numerals. The differences arise primarily because a longer sleeve bearing 22 is required than is the case with the embodiment of FIG. 1. The sleeve bearing 22 comprises a part 23 which is mounted within the annular bush 11 in a similar manner to the sleeve bearing 12, and a part 24 which protrudes a substantial distance beyond the end of the annular bush 11 into the interior of the bellows 17 and has an outside diameter which is substantially smaller than the inside diameter of the annular bush 11. The ring 19 lies between the part 24 and the annular bush 11. The ring 19 is held in contact with the end convolution 18 of the flexible bellows 17 by a spring 25 which is housed within an annular chamber 26 defined by the parts 23 and 24, the ring 18 and the annular bush 11. The spring 24 bears between the part 26 and the ring 18. The hole 20, which extends axially through the part 24, affords a conduit communicating with the annular chamber 26.

The material from which the absorbent resilient ring 19 is constructed is selected to suit the temperature to which it is likely to be subjected during operation of the vacuum circuit interrupter. Felt may be used if the temperature is not too high and glass wool would be suitable for use in higher temperature conditions. Other suitable materials include synthetic plastics (e.g. polyurethane) in fibrous or porous form.

In operation of the invention a suitable damping liquid is injected through the hole 20 into the ring 19. When the ring 19 is loaded with a sufficient quantity of the damping liquid a small proportion of the damping liquid flows onto the end convolution 18 and creeps along the internal surface of the bellows wall of the bellows 17 so that a film 27 of the damping liquid is formed on the internal surface of the bellows wall of the bellows 17. It will be seen that the internal surface of the bellows wall of the bellows 17 is that surface which is not in contact with the vacuum within the casing.

A suitable damping liquid may be a mineral or silicone oil. In general, any liquid which has a high hysteresis factor and which is capable of being maintained as a thin film on a surface of a bellows wall may be used as a means for damping vibrations induced in the bellows. A hysteresis liquid is a liquid which when subjected to an alternating stress between molecular layers, has a stress/strain curve which follows a closed loop, and which absorbs mechanical energy which is dissipated as heat in the liquid.

In operation of the vacuum circuit interrupter, the actuating rod 15 is moved by means of an external actuator (not shown) to which it is connected, so that the relatively movable contacts of the vacuum circuit interrupter are brought into or out of engagement with each other. It will be appreciated that such movement of the actuating rod 15 causes axial expansion or contraction of the bellows wall of the bellows 17, and it has been found that the presence of the film 27 of damping liquid substantially reduces the mechanical vibrations which are induced in the flexible bellows 17 after such expansion or contraction.

In a particular vacuum circuit interrupter, where a film of silicone B29 oil was applied to the internal surface of a stainless steel bellows of 0.005 in. wall thickness, 1½ in. diameter and 2 in. free length, the mechanical vibrations following a movement of the actuating rod 15 were substantially damped out in less than 20 milliseconds whereas a period of over 100 milliseconds elapsed before the mechanical vibrations of a similar bellows, which had been degreased and dried, were substantially damped out.

It will be appreciated that it is not essential to inject the damping liquid into the ring 19 after the vacuum circuit interrupter has been assembled, the ring 19 may be loaded with the damping liquid before it is inserted in position. Furthermore, it will be appreciated that a film 27 of damping liquid may be initially applied to the bellows 17 by any other convenient means before or after the bellows is assembled in the vacuum circuit interrupter, such a film being maintained during operation by damping liquid in the reservoir.

Formation upon the internal surface of the bellows of a film of damping liquid which is an oil may be improved by the use of additives such as those that are already employed to promote wetting of cylinder walls of internal combustion engines.

It will be appreciated that means for damping vibrations in a bellows in accordance with this invention are not limited to use with bellows which form part of a vacuum circuit interrupter. Furthermore, it will be understood that a satisfactory damping effect will be achieved when the external surface of the bellows wall of a bellows employed in such other applications is coated with a film of damping liquid.

Instead of the bellows 17 shown, there may be provided suitable equivalent constructions, for example built-up constructions incorporating flexible metal bellows or diaphragms, which may generally be referred to as bellows means.

I claim:

1. Bellows having a bellows wall and including a reservoir for a hysteresis liquid, said reservoir being formed of absorbent resilient material, and part of a surface of said bellows wall being associated with said reservoir so that a film of said hysteresis liquid is maintained on said surface when said part is in contact with hysteresis liquid in said reservoir.

2. Bellows means as claimed in claim 1, wherein said absorbent resilient material is spring loaded into contact with said part.

3. Bellows means as claimed in claim 1, wherein said hysteresis liquid is a silicone or a mineral oil.

4. A vacuum circuit interrupter comprising an evacuated casing; a pair of relatively movable contacts contained within said evacuated casing; bellows means having a bellows wall, said bellows wall defining a surface which is not in contact with the vacuum within said evacuated casing; a movable one of said pair of relatively movable contacts being sealed to said evacuated casing by said bellows means; wherein the improvement comprises:

said bellows means including a reservoir for a hysteresis liquid, said reservoir being formed of absorbent resilient material, and at least part of said surface being associated with said reservoir so that a film of said hysteresis liquid is maintained on said surface when said part is in contact with hysteresis liquid in said reservoir.

5. A vacuum circuit interrupter as claimed in claim 4, wherein the improvement further comprises said surface being defined by an internal surface of said bellows means.

6. A vacuum circuit interrupter as claimed in claim 4, wherein the improvement further comprises spring loading means whereby said absorbent resilient material is spring loaded into contact with said part.

7. A vacuum circuit interrupter as claimed in claim 4, wherein the improvement further comprises said hysteresis liquid being a silicone or a mineral oil.

8. A vacuum circuit interrupter comprising an evacuated casing; a pair of relatively movable contacts contained within said evacuated casing; rod means carrying a movable one of said pair of relatively movable contacts; bellows means having a bellows wall surrounding part of said rod means, said bellows wall having an internal surface which is not in contact with the vacuum within said evacuated casing; said rod means being sealed to the evacuated casing by said bellows means; and bearing means; said rod means being slidably supported within said bearing means; wherein the improvement comprises:

(i) said bearing means having a face normal to the axis of said rod means; and
(ii) said bellows means including a reservoir for a hysteresis liquid, said reservoir being formed of absorbent resilient material and being trapped between said face and at least part of said surface so that a film of said hysteresis liquid is maintained on said surface when said part is in contact with hysteresis liquid in said reservoir.

9. A vacuum circuit interrupter as claimed in claim 8, wherein the improvement further comprises means defining a conduit through said bearing means, said conduit communicating with said reservoir.

10. A vacuum circuit interrupter as claimed in claim 9, wherein the improvement further comprises spring-loading means whereby said reservoir is spring loaded into contact with said part.

11. A vacuum circuit interrupter as claimed in claim 8, wherein the improvement further comprises said hysteresis liquid being a silicone or a mineral oil.

References Cited

UNITED STATES PATENTS

| 2,651,327 | 9/1953 | Larkin | 92—41 |
| 2,747,614 | 5/1956 | Gray | 92—41 X |
| 2,794,885 | 6/1957 | Jennings. | |
| 3,213,764 | 10/1965 | Nelson et al. | 92—41 |

FOREIGN PATENTS

| 834,242 | 8/1938 | France. |

ROBERT S. MACON, Primary Examiner

U.S. Cl. X.R.

92—41; 200—83, 166